Patented Nov. 21, 1950

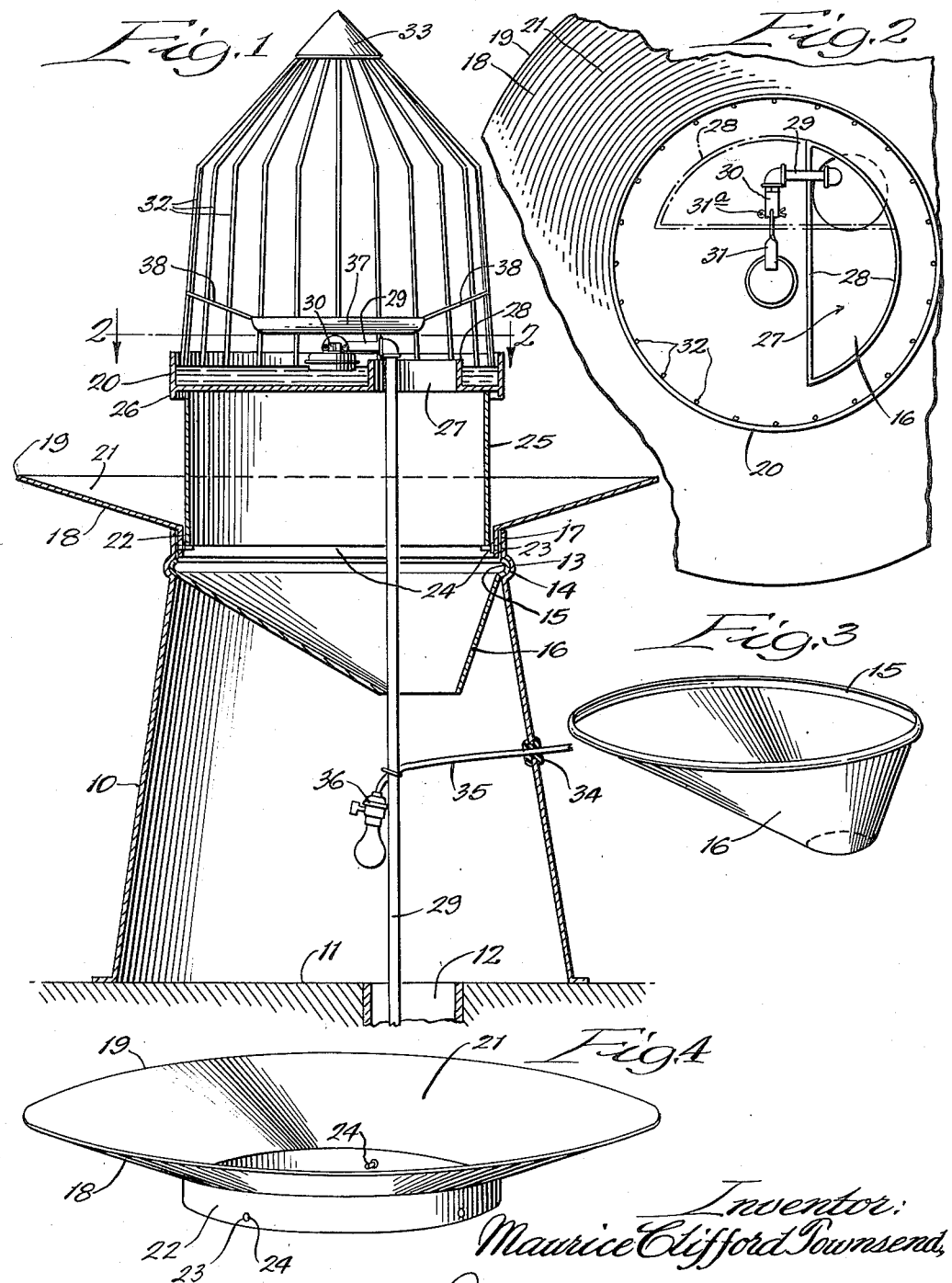

2,530,922

UNITED STATES PATENT OFFICE 2,530,922

WATER FOUNTAIN FOR POULTRY

Maurice Clifford Townsend, Hartford City, Ind.

Application October 1, 1945, Serial No. 619,557

4 Claims. (Cl. 119—74)

This invention relates to a water fountain for poultry and the like.

It has long been desired to place water fountains in poultry houses and enclosures where water will be constantly made available for poultry and where the temperature in the winter time is warmer and there is less danger of freezing. Such a project, however, has been unsuccessful up to the present time because chickens when drinking invariably get water on their beaks and gills, most of which drops on the floor and litter when they raise their heads to swallow. They also toss their heads after each drink and thus distribute water over an area around the fountain. Water soaks into the litter and renders the entire area unhealthful and unsanitary. Because of such unsanitary aspects, raisers of poultry have been disposed to place the fountains in areas away from the poultry house and where the water is less available and danger of freezing is greater.

An object of the present invention is to provide a drinking fountain which may be placed within the poultry house without danger of wetting the litter or of creating an unsanitary condition. A further object is to provide automatic means for supplying water and preventing freezing. Yet another object is to provide a fountain structure which may be quickly disassembled for cleaning and for reassembly. A further object is to provide a drain structure in combination with a supporting tower structure which will supply plenty of water, but which will prevent the throwing of water droplets about the area. Other specific objects and advantages will appear as the specification proceeds.

The invention is illustrated, in a preferred embodiment, by the accompanying drawing, in which—

Figure 1 is a vertical sectional view of structure embodying my invention; Fig. 2, a transverse sectional view, the section being taken as indicated at line 2 of Fig. 1; Fig. 3, a perspective view of a funnel or drain member supported within the tower; and Fig. 4, a perspective view of a perch and drain member supported so as to extend outside the tower.

In the illustration given, 10 designates a metal base adapted to rest upon the floor 11 of a poultry house or upon any other suitable surface. Preferably, the drain tile 12 extends through the floor of the house. The upper end of the base 10 is provided with an outwardly-extending rib 13 providing on the inside an annular groove 14 adapted to receive the bead 15 of the funnel member 16. Above the rib 13 is a short band 17 adapted to provide a support for the perch or drain member 18.

The member 18 provides an outer flattened edge portion 19 which is found to be very satisfactory as a perch for the fowl which is about to drink and which supports it at a convenient distance from the water tank 20. Merging with the perch ring 19 and forming a continuation thereof is an inclined wall 21 which leads into the tower. The lower end of the inclined wall 21 merges into a cylindrical band 22 which lies in a position parallel with the top portion 17 of the base 10. The band or collar 22 is provided with spaced openings 23 through which extend pins 24. The pins extend inwardly from the member 22 and provide spaced supports for the cylindrical member 25. Member 25 supports the tank 20 at a spaced distance above the member 18.

The tank 20 may be of any suitable material. In the illustration given, I provide a rotatable cylindrical member 20 having a depending annular flange 26 which serves to maintain the tank upon the member 25. The tank 20 is provided with a half-moon-shaped opening 27 which is bordered by raised flanges 28.

In the construction illustrated, a water pipe 29 extends upwardly through the conduit 12 and through the lower end of the funnel member 16 and thence upwardly through the opening 27 of the water tank 20. The pipe is equipped at its end with fittings of well-known construction which provide a discharge outlet 30 and a valve controlled by a float member 31. The shaft of the float member 31 is in two parts, pivotally connected by a cotter key at 31ª. Since the discharge, valve, and float structure are of well-known design, a detailed description is here believed unnecessary.

The float structure is so adjusted as to maintain the level of the water within the tank 20 at not above ¾ inch depth. I prefer to maintain a level between ½ inch and ¾ inch depth. The reason for this extremely shallow depth is that poultry drinking from such a shallow pool do not tend to toss their heads and to scatter water about the area. I have discovered that when poultry drink from a deep pool, water enters the nostrils which are about an inch above the end of the beak, and because of this discomfort and to clear the nostrils the fowl tosses its head. By maintaining the depth of the pool at the low level indicated, there is much less tendency for the water to be thrown by the fowl.

Above the tank 20, I provide a cage 32 having a solid cap 33 and with the lower portion of the cage received within the walls of the tank 20. The spacing of the longitudinal wires of the cage is such that the fowl can readily extend its head and neck between the wires, but the wires prevent fowls getting in and soiling the water.

In order to prevent freezing of the pipe 29, I bring through an opening 34 of the base 10 an electric element 35, and support adjacent to the pipe a heating element which may, if desired, be an ordinary light bulb 36. Heat from the element passes upwardly along the pipe 29, through the opening of the funnel member 16, and through the opening 27 of the tank 20. In order to maintain a portion of the heat over the body of the liquid to prevent freezing of the control valve and liquid, I support a hood 37 above the central portion at least of the liquid by means of rods 38 which engage wires of the cage 32.

In the operation of the structure, the parts are assembled as shown, with the perch member 18 resting upon the top portion 17 of base 10 and with the cylindrical spacer member 25 resting upon the pins 24 carried by the collar 22 of member 18.

The tank 20 is next placed in position. This is accomplished without removing the pipe members and the float structure, etc., and through the use of the half-moon-shaped opening 27 of tank 20. The tank is rotated until the float member 31 (when the float is swung upwardly about pivot 31ª), discharge member 30, and the upper portion of pipe 29 all lie within or are aligned with the half-moon-shaped opening. The tank is then dropped into position as indicated in dotted lines in Fig. 2. The tank may then be rotated to the position shown in full lines in Fig. 2 and the arm 31 swung to horizontal position. The pivotal connection provided at 31ª of the shaft of the float permits the float to be raised vertically about the pivot so that all of the pipe and float structure are aligned vertically with the half-moon-shaped opening and the tank may be placed in position upon the supporting member 25. The float may then be dropped to horizontal position, as shown in Fig. 2, where it is effective in controlling the valve (not shown). The valve consists of a spring-urged plunger which is actuated by the float valve in opening and closing the valve. When the float is in low position, it presses inwardly on the plunger of the valve and maintains it open. When it swings to horizontal position, the spring urges the plunger outwardly and closes the valve. The valve remains closed when the float is swung upwardly about the pivot 31ª to a vertical position. Since the valve structure just described is of old and well-known construction, a detailed description is believed unnecessary.

The cage 32 may next be dropped in position so that the lower end portion thereof rests within the tank 20.

The float member 31 maintains the water level at the desired low depth, namely between ½ inch to ¾ inch. This operation is automatic, the water level being maintained as the chickens or other types of poultry consume the water.

The thirsty fowl jumps easily to the perch 19, with its feet resting on the outer edge thereof, and drinks from the tank 20. The flat ledge 19 which forms the perch is found very satisfactory from the standpoint of convenience and comfort for the fowl and also from the standpoint of making the fowl stand facing the tank. Should the fowl step forward, the inclined walls tend to unbalance it and it again returns to the perch 19. When water drips from the beak and gills of the fowl, it falls into the inclined apron below and thus passes inwardly along the collar 22 into the funnel member 16 within the tower. Such water drips from the funnel 16 downwardly and out of the drain pipe 12. Thus, all moisture is excluded from the poultry house and the water dripping from the beak and gills of the fowl is caught and disposed of within the interior of the tower.

The danger of freezing is reduced to a minimum by reason of the fountain being kept within the poultry house, and to further safeguard the pipe the heating element provides a sufficient flow of heat along the pipe while the canopy or hood 37 maintains a sufficient amount of warm air above the tank itself to prevent freezing. If desired, the walls 10 of the base may be provided with a layer of insulation to further protect the lower area of the pipe and to conserve the heat generated by the element 36.

When it is desired to clean the structure, the parts can be simply lifted off each other, the reverse movement already described with respect to tank 20 being employed for its removal. The spacer cylinder 25 may then be lifted off of pins 24, and the perch member 18 lifted off of the flange portion 17 of base 10. The funnel member 16 may be removed, if desired, but is directly accessible as it stands, for thorough cleaning. If desired, the base may be drawn up and removed over the pipe 29 without disturbing the pipe.

With the foregoing structure, a readily cleanable and sanitary structure is provided and one which may be operated within the poultry house without danger of wetting or rendering unhealthful the litter about the fountain. Water is made available at all times to the poultry where they most require it and is protected from freezing by the means described.

While the invention has been described in connection with a poultry house floor having a drain pipe therethrough, it will be understood that any other suitable discharge means may be employed. If desired, a pan to catch drain water may be inserted within the wide walls of the base to receive such waste water.

While in the foregoing description I have set forth certain details as descriptive of one embodiment of the invention, it will be understood that such details may be varied widely by those skilled in the art without departing from the spirit of my invention, and further that the claims herein are to be looked upon as definitive of the invention.

I claim:

1. In a water fountain for poultry, a hollow tower, a perimetric perch carried by said tower and having a continuous wall inclined downwardly and inwardly to discharge water into the tower and extending laterally of said tower to support the feet of poultry along its rim portion at a spaced distance from the tower, a spacer wall carried by said tower and extending to a height substantially above the outer rim portion of said perch, and an open water tank carried by said spacer wall, said tank positioned so that the water therein is accessible only to poultry standing on the rim portion of the perch.

2. In a water fountain for poultry, a hollow tower, a perimetric perch consisting of a continuous inclined wall extending into said tower, said wall being inclined downwardly and inwardly to discharge water into the tower and extending laterally of said tower to support the feet of poultry along its rim portion at a spaced distance from the tower, a spacer wall supported upon said tower and extending to a height substantially above the rim portion of said perch, means within said tower for receiving water from said perch, and an open water tank carried by said spacer wall, said tank positioned at a height sufficient to prevent access to the water therein except by poultry standing on the outer rim portion of the perch.

3. A water fountain for poultry, comprising a hollow tower, a perimetric perch consisting of a continuous wall inclined downwardly and inwardly and equipped at its inner end with a vertical flange adapted to be received into the open top end of said tower, a spacer wall having its upper end extending to a height substantially above the outer rim portion of said perch, spaced means carried by said vertical flange of the perch for supporting said spacer wall of said perch, and an open water tank equipped with a downwardly-extending flange for separably supporting said tank upon the spacer wall, said water tank being accessible only to poultry perched upon the edge of said flange.

4. A water fountain for poultry, comprising a hollow tower, a perimetric perch consisting of a continuous wall extending about the tower and having its inner end provided with a downwardly-extending flange adapted to be telescopically received within said tower, said downwardly-extending flange being provided with inwardly-extending projections, a separable spacer wall carried by said projections at a spaced distance from said downwardly-extending flange of the perch, and an open water tank removably supported upon the top of said spacer wall, said tank located at a height so that it is accessible only to poultry standing on the rim portion of the perch.

MAURICE CLIFFORD TOWNSEND.

REFERENCES CITED

The following references are of record in the file of this patent:

UNITED STATES PATENTS

| Number | Name | Date |
|---|---|---|
| 1,038,021 | Summers | Sept. 10, 1912 |
| 1,165,428 | McNeil | Dec. 28, 1915 |
| 1,673,814 | Edington | June 19, 1928 |
| 1,828,104 | Divekey | Oct. 20, 1931 |
| 1,862,217 | Gay et al. | June 7, 1932 |
| 2,201,901 | Keen | May 21, 1940 |

FOREIGN PATENTS

| Number | Country | Date |
|---|---|---|
| 371,480 | Great Britain | Apr. 28, 1932 |